(12) United States Patent
Joret et al.

(10) Patent No.: US 12,037,940 B2
(45) Date of Patent: Jul. 16, 2024

(54) SUPERSONIC AIR INLET OF AN AIRCRAFT PROPELLING ASSEMBLY COMPRISING A SUPPORT ARM DE-ICING DEVICE AND DE-ICING METHOD

(71) Applicant: SAFRAN NACELLES, Gonfreville-l'Orcher (FR)

(72) Inventors: Jean-Philippe Joret, Moissy-Cramayel (FR); Hazem Kioua, Moissy-Cramayel (FR); Emmanuel Lesteven, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/247,037

(22) PCT Filed: Oct. 1, 2021

(86) PCT No.: PCT/EP2021/077196
§ 371 (c)(1),
(2) Date: Mar. 28, 2023

(87) PCT Pub. No.: WO2022/073889
PCT Pub. Date: Apr. 14, 2022

(65) Prior Publication Data
US 2024/0018902 A1    Jan. 18, 2024

(30) Foreign Application Priority Data
Oct. 8, 2020    (FR) ...................... 2010292

(51) Int. Cl.
*F02C 7/04*   (2006.01)
*F02C 7/047*  (2006.01)

(52) U.S. Cl.
CPC .......... *F02C 7/047* (2013.01); *F05D 2220/80* (2013.01)

(58) Field of Classification Search
CPC ......... F01D 25/02; F02C 7/047; B64D 33/02; B64D 15/02; B64D 15/04; B64D 2033/026; F05D 2220/80
(Continued)

(56) References Cited

U.S. PATENT DOCUMENTS 3,341,114 A * 9/1967 Larson .................... F02C 7/047
                                                    416/232
4,783,026 A * 11/1988 Rumford ................. F02C 7/047
                                                    244/134 B
(Continued)

FOREIGN PATENT DOCUMENTS

| FR | 967835 A | 11/1950 |
|---|---|---|
| FR | 983998 A | 6/1951 |
| GB | 885908 A | 1/1962 |

OTHER PUBLICATIONS

Search Report from the French Intellectual Property Office on corresponding FR application (FR2010292) dated Jun. 15, 2021.
(Continued)

*Primary Examiner* — David E Sosnowski
*Assistant Examiner* — Maxime M Adjagbe
(74) *Attorney, Agent, or Firm* — Alumen IP Law PC (57) ABSTRACT

A supersonic air intake of an aircraft propulsion assembly comprises: •• pipe with a longitudinal axis configured to guide the flow of air into the turbine engine, •• a speed reducer fixedly mounted inside the pipe along the longitudinal axis, •• at least one support arm linking the speed reducer to the pipe and having an upstream outer wall and a downstream outer wall together defining a cavity, and •• at least one de-icing device having an inner wall mounted in the cavity opposite the upstream outer wall in order to together define a calibrated de-icing space, as well as a (Continued)

member for supplying and a member for discharging a de-icing air flow in the de-icing space.

18 Claims, 7 Drawing Sheets

(58) Field of Classification Search
USPC .................................................. 244/134 B
See application file for complete search history.

(56) References Cited

U.S. PATENT DOCUMENTS

| 6,442,944 | B1 * | 9/2002 | Skur, III | ................ | F01D 25/02 |
|---|---|---|---|---|---|
| | | | | | 60/39.093 |
| 8,209,953 | B2 * | 7/2012 | Winter | .................. | F02C 7/045 |
| | | | | | 137/15.1 |
| 2017/0321604 | A1 * | 11/2017 | Lourit | .................... | F02C 7/047 |

OTHER PUBLICATIONS

International Search Report and Written Opinion on corresponding PCT application (PCT/EP2021/077196) from International Searching Authority (EPO) dated Jan. 11, 2022.

* cited by examiner

SUPERSONIC AIR INLET OF AN AIRCRAFT PROPELLING ASSEMBLY COMPRISING A SUPPORT ARM DE-ICING DEVICE AND DE-ICING METHOD

TECHNICAL FIELD

The present invention relates to the field of de-icing a supersonic air inlet, and more particularly the support arms, of an aircraft propelling assembly.

Figure 1:
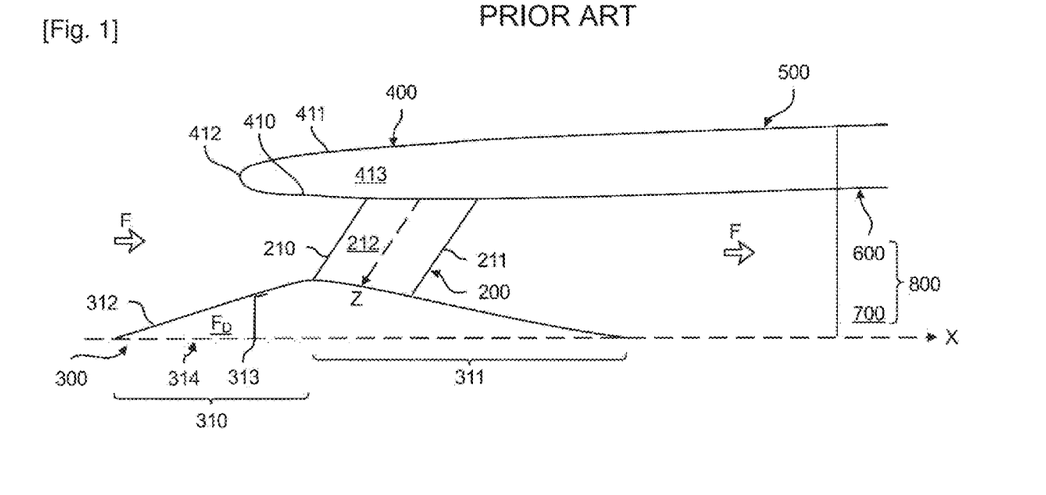
FIG. 1 is a representation in a longitudinal half cross-section view of a supersonic air inlet of an aircraft propelling assembly according to prior art.

In a known manner, with reference to FIG. 1, a supersonic aircraft propelling assembly 800 extends longitudinally along an axis X oriented from upstream to downstream and comprises a turbomachine 700 and a nacelle 600 with a longitudinal axis X. The turbomachine 700 is configured to allow propulsion of the aircraft at supersonic speeds from the acceleration of a subsonic air flow F circulating from upstream to downstream in the turbomachine 700. The turbomachine 700 conventionally comprises the following elements, not represented and cited from upstream to downstream: a fan, one (or more) compressor(s), a combustion chamber and one (or more) turbine(s). The nacelle 600 in turn extends externally around the turbomachine 700 and at its upstream end comprises a supersonic air inlet 500. Subsequently, the terms "upstream" and "downstream" are defined with respect to the orientation of the longitudinal axis X. The terms "inside" and "outside" in turn are defined along the radial direction with respect to the longitudinal axis X.

In a known manner, as illustrated in FIG. 1, the supersonic air inlet 500 comprises a duct 400 with a longitudinal axis X configured to guide the air flow F into the turbomachine 700. The duct 400 comprises an internal wall 410 and an external wall 411 connected through an air inlet lip 412 upstream and delimiting together an annular cavity 413. The air inlet 500 also comprises a speed attenuator 300 fixedly extending inside the duct 400 along the longitudinal axis X as well as support arms 200 connecting the speed attenuator 300 to the duct 400.

In a known manner, with reference to FIG. 1, the speed attenuator 300 conventionally comprises an upstream portion 310 with an increasing cross-sectional area from upstream do downstream and a downstream portion 311 with a decreasing cross-sectional area from upstream do downstream. The upstream portion 310 comprises a conical outer wall 312 with a tapered edge extending protruding from the duct 400 in such a way as to generate a shock wave reducing the supersonic speed of the air flow F entering the duct 400 into a subsonic speed.

In a known manner, still with reference to FIG. 1, each support arm 200 extends from the internal wall 410 of the duct 400 to the speed attenuator 300, at its downstream portion 311 in this example, along an axis Z oriented inwardly and upstream with respect to the longitudinal axis X. In this example, each support arm 200 comprises an upstream outer wall 210 and a downstream outer wall 211 having U-shaped cross-sections respectively open downstream and upstream, so as to delimit together a cylindrical cavity 212 with an oval cross-section.

In practice, ice is likely to form and accumulate on the conical outer wall 312 of the speed attenuator 300 and on the upstream outer wall 210 of the support arms 200, which disturbs intake of the air flow F into the duct 400. As illustrated in FIG. 1, to avoid this, it is known to add an inner partition wall 313 in the upstream portion 310 of the speed attenuator 300, so as to delimit with the conical outer wall 312 a cavity 314 in which a de-icing air flow $F_D$ circulates to heat the conical outer wall 312 by heat exchanges. The de-icing air flow $F_D$ is conventionally collected and discharged in the turbomachine 700, especially in the compressor, and conveyed through conduits (not represented).

In fact, such a solution only allows de-icing of the speed attenuator 300. Furthermore, such a solution cannot be transposed to the support arms 200. Indeed, the upstream outer wall 210 is extended, which would require a cavity with a too large volume to allow effective de-icing. In addition, the support arms 200 in practice comprise structural parts for holding the speed attenuator 300 as well as the ducts for conveying the de-icing air flow $F_D$ to the speed attenuator 300, which does not allow easy integration.

The invention thus aims to efficiently and conveniently de-ice the support arms of a supersonic air inlet of an aircraft propelling assembly.

In prior art, from patent applications GB885908A and FR983998A, supersonic and subsonic air inlets are known.

SUMMARY

The invention relates to a supersonic air inlet of an aircraft propelling assembly, said aircraft propelling assembly extending longitudinally along an axis oriented from upstream to downstream and comprising a turbomachine configured to allow propulsion of the aircraft at supersonic speeds from the acceleration of a subsonic air flow circulating from upstream to downstream in the turbomachine, said supersonic air inlet comprising:
- a duct with a longitudinal axis comprising an internal wall configured to guide the air flow in the turbomachine and an external wall which are connected upstream through an air inlet lip and delimiting together an annular cavity,
- a speed attenuator fixedly mounted inside the duct along the longitudinal axis and comprising a conical outer wall with a tapered edge upstream so as to generate a shock wave reducing the supersonic speed of the air flow entering the duct into a subsonic speed, and
- at least one support arm connecting the speed attenuator to the duct, said support arm comprising an upstream outer wall and a downstream outer wall together delimiting a cavity extending from the internal wall of the duct to the speed attenuator along an axis inwardly oriented.

The invention is remarkable in that the supersonic air inlet comprises at least one de-icing device comprising:
- an inner wall mounted in the support arm cavity facing the upstream outer wall in order to delimit together a calibrated de-icing volume,
- at least one member for supplying the de-icing volume with de-icing air flow, and
- at least one member for discharging the de-icing air flow from the de-icing volume.

The de-icing device of the invention advantageously allows de-icing the support arms of a supersonic air inlet of an aircraft propelling assembly, by hot air circulation, namely a de-icing air flow, against the wall to be de-iced, namely the upstream outer wall. In addition, the de-icing air flow circulates in a calibrated de-icing volume with restricted dimensions, to concentrate the de-icing air flow as close to the wall as possible and thus promote heat exchanges. This effectively and easily makes it possible to remove the ice that has formed and prevents it from occurring. In addition, the de-icing volume is delimited by simply adding an inner wall facing the upstream outer wall, which can thus be easily integrated into the support arms, which conventionally comprise structural parts to enable them to be held and ducts for conveying de-icing air flows to the speed attenuator.

Preferably, the supply member is in the form of a supply conduit. Also preferably, the discharge member is in the form of a discharge conduit.

Preferably, the speed attenuator has an upstream tapered edge that is unique and closed.

According to one preferred aspect, the supersonic air inlet comprises an equal number of support arms and de-icing devices, an inner wall being mounted in the cavity of each support arm, in order to de-ice each support arm.

According to one aspect of the invention, the inner wall of the de-icing device comprises a guide portion for guiding the de-icing air flow substantially identical to that of the upstream outer wall of the support arm. It is set out that by "substantially identical", it is meant that the shape of the guide portion varies by 20% at most from that of the external upstream portion. In other words, the guide portion follows the contours of the upstream outer wall so as to limit de-icing volume dimensions and concentrate circulation of the de-icing air in contact with the upstream outer wall.

According to one preferred aspect, the inner wall of the de-icing device comprises an attachment portion attached to the joint of the upstream outer wall and the downstream outer wall, in order to hold the inner wall. In addition, the de-icing air flow is in contact with the entire upstream outer wall of the support arm.

According to one aspect of the invention, the de-icing volume comprises a transverse surface area with a substantially constant value along the axis of the support arm in order to maintain the speed of the de-icing air flow and consequently promote heat exchanges with the upstream outer wall. By "substantially constant", it is meant that the transverse surface area varies by 20% at most along the axis of the support arm.

Preferably, the de-icing volume has a downstream facing U-shaped transverse surface area. In other words, the upstream outer wall and the guide portion each have a downstream facing U-shaped cross sectional area. The de-icing volume thus extends only at the upstream perimeter of the cavity of the support arm, while the central part of the support arm conventionally houses structural parts to ensure holding thereof and a duct for conveying de-icing air flow to the speed attenuator.

Preferably, the de-icing volume has a thickness, defined as the radial distance separating the upstream outer wall of the inner wall from the axis of the support arm, which is substantially constant over a transverse surface area of the de-icing volume. Preferably, the thickness is less than 30 mm and more than 2 mm to ensure sufficient speed of the de-icing air flow.

According to one aspect of the invention, the de-icing volume extends along the axis of the support arm between an external opening formed in the internal wall of the duct and an internal opening formed in the wall of the speed attenuator, preferably an inlet and outlet opening respectively for the de-icing air flow. In other words, de-icing air flow circulates in contact with the entire length of the upstream outer wall for complete overall de-icing.

Preferably, the supply member is housed in the annular cavity of the duct. Such an arrangement allows the de-icing air flow to be collected in the turbomachine, conventionally at the compressor, and simply and conveniently conveyed through the duct into the support arm. Preferably, the discharge member is housed in the speed attenuator. Such an arrangement allows the de-icing air flow taken into the turbomachine downstream of the speed attenuator to be simply and conveniently discharged.

According to one aspect of the invention, the de-icing device comprises a fluidic connection member with a scalable cross-sectional area comprising an inlet opening leading to the supply member and an outlet opening leading to an opening of the de-icing volume, preferably the external opening. Such a fluidic connection member advantageously makes it possible to connect the supply member and the de-icing volume, its scalable cross-sectional area promoting circulation of the de-icing air flow. More precisely, the scalable cross-sectional area allows a gradual transition from the usually circular cross-section of the supply member, to the preferably U-shaped cross-section of the de-icing volume, by limiting head losses to optimize the speed of the de-icing air flow and consequently heat exchanges with the upstream outer wall.

Preferably, the fluidic connection member has an inlet opening with a circular cross-section cooperating with the supply member. Preferably, the fluidic connection member has an outlet opening with a U-shaped cross-section cooperating with an opening of the de-icing volume, preferably the external opening.

According to one aspect of the invention, the fluidic connection member has a cross-sectional area with a substantially constant value throughout its length, preferably equal to the value of the cross-sectional surface area of the de-icing volume, preferably equal to the value of the cross-sectional surface area of the supply member. It is set out that by "substantially constant", it is meant that the transverse surface area of the fluidic connection member varies by at most 20%. In other words, the fluidic connection member has a worked form, namely with a scalable cross-sectional area and a constant cross-sectional surface area, to avoid any reduction in the speed of the de-icing air flow and thus promote heat exchanges.

According to a first aspect of the invention, the fluidic connection member is in the form of a hollow conduit delimiting the scalable cross-sectional area of the fluidic connection member. In other words, the fluidic connection member only has a hollow conduit and is free of volume element housed in the conduit, the shape of the conduit being worked to have a scalable cross-sectional area.

According to a second aspect of the invention, the fluidic connection member comprises a hollow conduit and at least one volume element housed in the hollow conduit so as to delimit together the scalable cross-sectional area of the fluidic connection member. The volume element advantageously allows the use of a conduit with a simplified shape. Preferably, the volume element is unique to promote circulation of the de-icing air flow.

According to a third aspect of the invention, the speed attenuator comprises an inner partition wall delimiting a cavity with the conical outer wall, the fluidic connection member comprising an auxiliary outlet opening configured to supply cavity of the speed attenuator with de-icing air flow. In other words, the fluidic connection member comprises an outlet opening leading into the de-icing volume and an auxiliary outlet opening to convey de-icing air flow into the cavity of the speed attenuator. The fluidic connection member thus has two outlet openings for de-icing the support arm and the speed attenuator.

Preferably, the auxiliary outlet opening extends internally to the outlet opening, namely radially inwardly of the axis of the arm. Preferably, the outlet opening has a U-shaped cross-section and the auxiliary outlet opening a circular cross-section housed between the branches of the U for minimal overall space.

Preferably, the fluidic connection member comprises two volume elements to delimit on either side the auxiliary outlet opening, preferably one upstream and the other downstream of the auxiliary outlet opening, in order to separate it from the outlet opening leading to the de-icing volume.

The invention also relates to a nacelle of an aircraft propelling assembly, said aircraft propelling assembly extending longitudinally along an axis oriented from upstream to downstream and comprising a turbomachine configured to allow propulsion of the aircraft at supersonic speeds from the acceleration of a subsonic air flow circulating from upstream to downstream in the turbomachine, said nacelle extending externally around the turbomachine and comprising at its upstream end a supersonic air inlet as previously described.

The invention further relates to an aircraft propelling assembly extending longitudinally along an axis oriented from upstream to downstream and comprising a turbomachine configured to allow propulsion of the aircraft at supersonic speeds from the acceleration of a subsonic air flow circulating from upstream to downstream in the turbomachine, said aircraft propelling assembly comprising a nacelle as previously described.

The invention additionally relates to a method for de-icing at least one support arm of a supersonic air inlet of an aircraft propelling assembly as previously described, said method comprising:
  a step of supplying the de-icing volume with de-icing air flow from the supply member, a step of circulating the de-icing air flow through the de-icing volume, in order to warm up the upstream outer wall of the support arm by heat exchanges, in order to de-ice it, and a step of discharging the de-icing air flow into the discharge member out of the de-icing volume.

Advantageously, such a de-icing method makes it easy, convenient and efficient to de-ice the support arms of a supersonic air inlet by circulating warm air locally against the wall to be de-iced in order to warm it up.

Preferably, the supply step is implemented by the fluidic connection member of the scalable cross-sectional area in order to ensure sufficient speed of the de-icing air flow in the de-icing volume.

Preferably, during the supply step, the fluidic connection member also supplies the speed attenuator cavity with de-icing air flow by virtue of the auxiliary outlet opening. This advantageously de-ices both the support arms and the speed attenuator with a combined supply.

The invention additionally relates to a supersonic air inlet of an aircraft propelling assembly, said aircraft propelling assembly extending longitudinally along an axis oriented from upstream to downstream and comprising a turbomachine configured to enable propulsion of the aircraft at supersonic speeds from the acceleration of a subsonic air flow circulating from upstream to downstream in the turbomachine, said supersonic air inlet comprising:
  a duct with a longitudinal axis comprising an internal wall configured to guide the air flow in the turbomachine and an external wall which are connected upstream through an air inlet lip and delimiting together an annular cavity,
  a speed attenuator fixedly mounted inside the duct along the longitudinal axis and comprising a conical outer wall with a tapered edge upstream so as to generate a shock wave reducing the supersonic speed of the air flow entering the duct into a subsonic speed, and
  at least one support arm connecting the speed attenuator to the duct, said support arm comprising an upstream outer wall and a downstream outer wall, together delimiting a cavity extending from the internal wall of the duct to the speed attenuator along an axis inwardly oriented,
  at least one de-icing device comprising:
    an inner wall mounted in the support arm cavity facing the upstream outer wall in order so as to delimit together a calibrated de-icing volume,
    at least one inner partition wall integrally mounted internally to the inner wall in order to define together a feed volume, said inner wall comprising upstream of the inner partition wall at least one perforated portion in order to fluidly communicate the feed volume and the calibrated de-icing volume,
    at least one member for supplying the feed volume with de-icing air flow, in order to supply the de-icing volume to de-ice the support arm, and
    at least one member for discharging the de-icing air flow from the de-icing volume.

Advantageously, such a de-icing device allows the de-icing air flow to be circulated as close as possible to the upstream outer wall and with a speed sufficient to promote heat exchanges between the de-icing air flow and the upstream outer wall, thus promoting de-icing. Such a de-icing device can thus make it possible to effectively de-ice the upstream outer wall and prevent the occurrence of ice on it.

Preferably, the feed volume extends from the internal wall of the duct along an axis inwardly oriented, preferably to the supersonic speed attenuator. Preferably, the feed volume comprises a semi-ellipsoidal cross-section with a curved, preferably tapered, upstream oriented edge.

Preferably, the de-icing device comprises a fluidic connection member with a scalable cross-sectional area comprising an inlet opening leading to the supply member and an outlet opening leading to the feed volume. Such a fluidic connection member advantageously makes it possible to connect the supply member and the feed volume, its scalable cross-sectional area promoting circulation of the de-icing air flow. More precisely, the scalable cross-sectional area allows a gradual transition from the conventionally circular cross-section of the supply member to the cross-section of the feed volume, by limiting head losses to optimize the speed of the de-icing air flow.

Preferably, the fluidic connection member has an inlet opening with a circular cross-section cooperating with the supply member. Preferably, the fluidic connection member comprises a semi-ellipsoidal cross-section outlet opening with a curved, preferably tapered, upstream oriented edge cooperating with the feed volume.

Preferably, the fluidic connection member comprises a cross-sectional surface area having a substantially constant value throughout its length, preferably equal to the value of the cross-sectional surface area of the feed volume, preferably equal to the value of the cross-sectional surface area of the supply member. It is set tout that by "substantially constant", it is meant that the transverse surface area of the fluidic connection member varies by at most 20%. Preferably, the fluidic connection member is in the form of a hollow conduit.

The invention also relates to a nacelle of an aircraft propelling assembly, said aircraft propelling assembly extending longitudinally along an axis oriented from upstream to downstream and comprising a turbomachine configured to allow propulsion of the aircraft at supersonic speeds from the acceleration of a subsonic air flow circulating from upstream to downstream in the turbomachine, said nacelle extending externally around the turbomachine and comprising at its upstream end a supersonic air inlet as previously described.

The invention further relates to an aircraft propelling assembly extending longitudinally along an axis oriented from upstream to downstream and comprising a turbomachine configured to allow propulsion of the aircraft at supersonic speeds from the acceleration of a subsonic air flow circulating from upstream to downstream in the turbomachine, said aircraft propelling assembly comprising a nacelle as previously described.

The invention additionally relates to a method for de-icing at least one support arm of a supersonic air inlet of an aircraft propelling assembly as previously described, said method comprising:
- a step of supplying the feed volume with de-icing air flow through the supply member,
- a step of circulating the de-icing air flow from the feed volume to the de-icing volume by passing through the perforated portion of the inner wall, so as to warm up the upstream outer wall of the support arm by heat exchanges, in order to de-ice it, and
- a step of discharging the de-icing air flow into the discharge member out of the de-icing volume.

BRIEF DESCRIPTION OF THE DRAWINGS

The invention will be better understood upon reading the following description, given as an example, and by referring to the following figures, given as non-limiting examples, in which identical references are given to similar objects.

It should be noted that the figures set out the invention in detail in order to implement the invention, said figures can of course be used to better define the invention if necessary.

DETAILED DESCRIPTION

Figure 2:
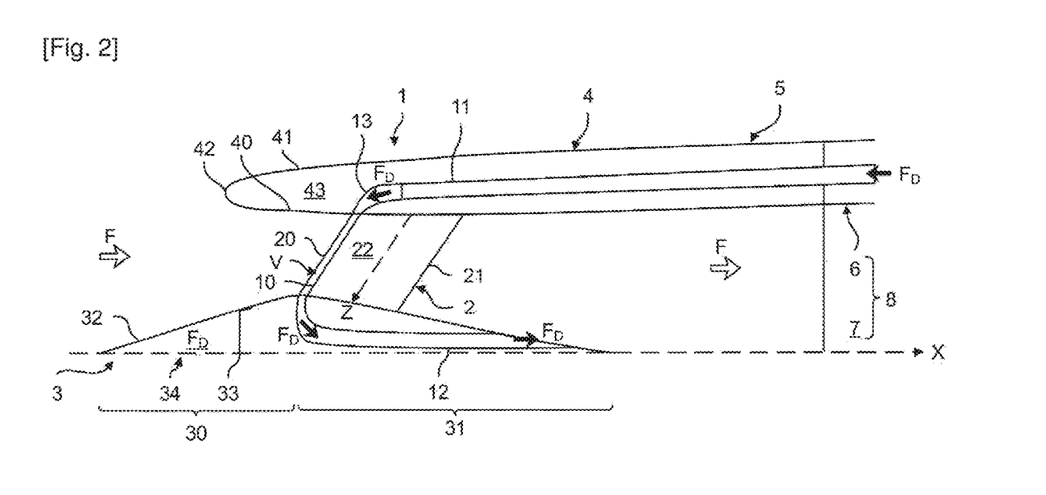
FIG. 2 is a representation in a longitudinal half cross-section view of a supersonic air inlet of an aircraft propelling assembly comprising a de-icing device according to one embodiment of the invention.

Referring to FIG. 2 and as described in the preamble, an aircraft propelling assembly 8 extends longitudinally along an axis X oriented from upstream to downstream and comprises a turbomachine 7 and a nacelle 6 of longitudinal axis X. The turbomachine 7 is configured to allow propulsion of the aircraft at supersonic speeds from the acceleration of a subsonic air flow F circulating from upstream to downstream in the turbomachine 7. The turbomachine 7 conventionally comprises the following elements, not represented and cited from upstream to downstream: a fan, one (or more) compressor(s), a combustion chamber and one (or more) turbine(s). The nacelle 6 in turn extends externally around the turbomachine 7 and at its upstream end comprises a supersonic air inlet 5. Subsequently, the terms "upstream" and "downstream" are defined with respect to the orientation of the longitudinal axis X. The terms "inside" and "outside" in turn are defined along the radial direction with respect to the longitudinal axis X.

As illustrated in FIG. 2 and described in the preamble, the supersonic air inlet 5 comprises a duct 4 with a longitudinal axis X configured to guide the air flow F into the turbomachine 7. The duct 4 comprises an internal wall 40 and an external wall 41 connected through an air inlet lip 42 upstream and delimiting together an annular cavity 43. The supersonic air inlet 5 also comprises a speed attenuator 3 fixedly extending inside the duct 4 along the longitudinal axis X as well as support arms 2 connecting the speed attenuator 3 to the duct 4.

With reference to FIG. 2 and as described in the preamble, the speed attenuator 3 conventionally comprises an upstream portion 30 with an increasing cross-sectional area from upstream to downstream and a downstream portion 31 with a decreasing cross-sectional area from upstream to downstream. The upstream portion 30 comprises a conical outer wall 32 with a tapered edge extending protruding from the duct 4 in such a way as to generate a shock wave reducing the supersonic speed of the air flow F entering the duct 4 into a subsonic speed. In practice, ice is likely to form and accumulate on the conical outer wall 32. To avoid this, an inner partition wall 33 is conventionally added to the upstream portion 3C of the speed attenuator 3, so as to delimit with the conical outer wall 32 a cavity 34 in which a de-icing air flow $F_D$ circulates to warm up the conical outer wall 32 by heat exchanges. The de-icing air flow $F_D$ is conventionally collected and discharged in the turbomachine 7, especially in the compressor, and conveyed through conduits (not represented).

Still with reference to FIG. 2 and as described in the preamble, each support arm 2 extends from the internal wall 40 of the duct 4 to the speed attenuator 3, at its downstream portion 31 in this example, along an axis Z oriented inwardly and upstream with respect to the longitudinal axis X. In this example, each support arm 2 comprises an upstream outer wall 20 and a downstream outer wall 21 with a U-shaped cross-section respectively open downstream and upstream, so as to delimit together a cylindrical cavity 22 with an oval cross-section. In practice, as with the speed attenuator 3, ice is likely to form and accumulate on the upstream outer wall 20 of the support arms 2, which disturbs intake of the air flow F into the duct 4.

According to the invention and still with reference to FIG. 2, for removing ice and preventing its occurrence on the support arms 2, the supersonic air inlet 5 further comprises one (or more) de-icing devices 1 comprising:
- an inner wall 10 mounted in the cavity 22 of the support arm 2 facing the upstream outer wall 20 so as to delimit together a calibrated de-icing volume V,
- one (or more) ducts for supplying 11 the de-icing volume V with de-icing air flow $F_D$,
- one (or more) ducts for discharging 12 the de-icing air flow $F_D$ of the de-icing volume V and,
- in the example of FIG. 2, a fluidic connection member 13 fluidly connecting the supply conduit 11 and the de-icing volume V.

In the example of FIG. 2, only one support arm 2 equipped with a de-icing device 1 is represented for the sake of clarity, but the supersonic air inlet 5 conventionally comprises several, usually three, support arms 2 preferably each equipped with a de-icing device 1 for overall de-icing. A single de-icing device 1 is described below, this description being valid for the other ones.

In the example in FIG. 2, the de-icing device 1 comprises a single supply conduit 11 and a single discharge conduit 12 for the sake of overall space saving and simplicity. In this example, the supply conduit 11 is specific to a single de-icing device 1, as is the discharge conduit 12. In other embodiments of the invention, the supply conduit 11 and/or the discharge conduit 12 are common or partially common to several de-icing devices 1. Alternatively or in addition, the supply conduit 11 and/or the discharge conduit 12 may also be partially common with the conduits (not represented) conveying the de-icing air flow $F_D$ to the speed attenuator 3, still for the sake of overall space reduction and simplicity.

As illustrated in FIG. 2, the supply conduit 11 is configured to collect the de-icing air flow $F_D$ from the air flow F at the compressor of the turbomachine 7 and extends into the annular cavity 43 of the duct 4. The supply conduit 11 leads into the fluidic connection member 13 and thus allows the de-icing air flow $F_D$ to be injected into the de-icing volume V at an external opening 23 of the support arm 2 (FIG. 3) delimited by the inner wall 10 and the upstream outer wall 20. The discharge conduit 12 is in turn configured to collect the de-icing air flow $F_D$ from the de-icing volume V at an internal opening 24 of the support arm 2 (FIG. 3) delimited by the inner wall 10 and the upstream outer wall 20. The discharge conduit 12 extends inside the speed attenuator 3 in order to discharge the de-icing air flow at its downstream end into the air flow F guided to the turbomachine 7.

In other embodiments of the invention, the discharge conduit 12 leads, in the same way as the supply conduit 11, to the compressor of the turbomachine 7. For this, the discharge conduit 12 preferably passes through the speed attenuator 3 and one of the other support arms 2 in order to join the duct 4. It goes without saying that the discharge conduit 12 could lead elsewhere without this modifying the invention. Similarly, it goes without saying that the supply conduit 11 could collect the de-icing air flow $F_D$ elsewhere than at the compressor of the turbomachine 7 without this modifying the invention.

It goes without saying that the supply and discharge of the de-icing air flow $F_D$ could be implemented differently and with any supply member 11 and discharge member 12. By way of example, the discharge member 12 could be in the form of an opening formed in the upstream outer wall 20 or the downstream outer wall 21.

Figure 3:
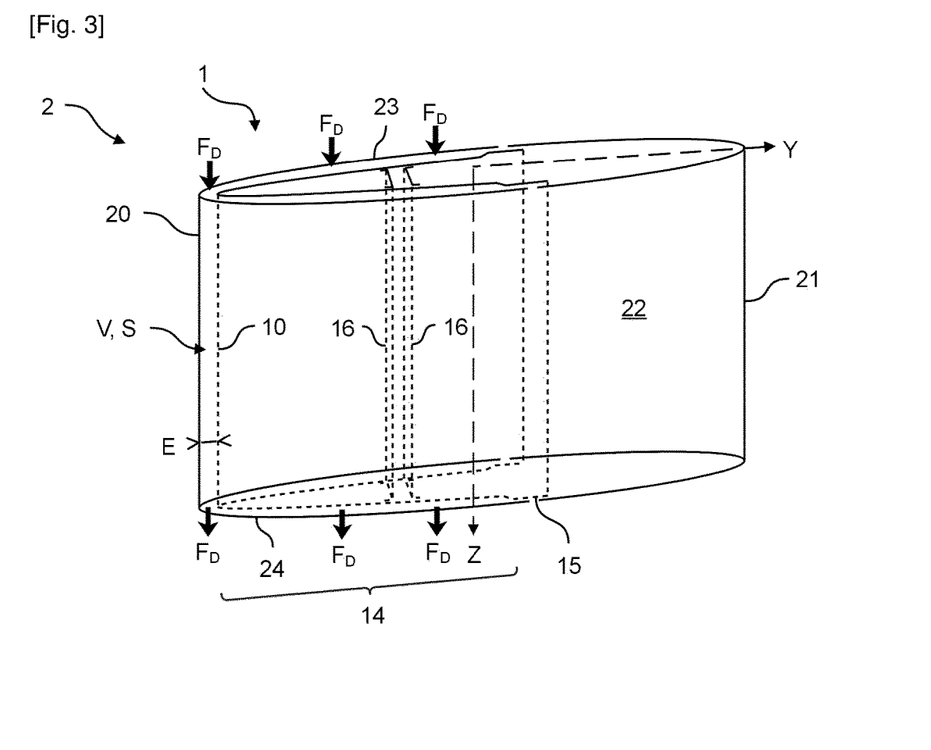
FIG. 3 is a perspective representation of a support arm of the air inlet of FIG. 2.
Figure 4:
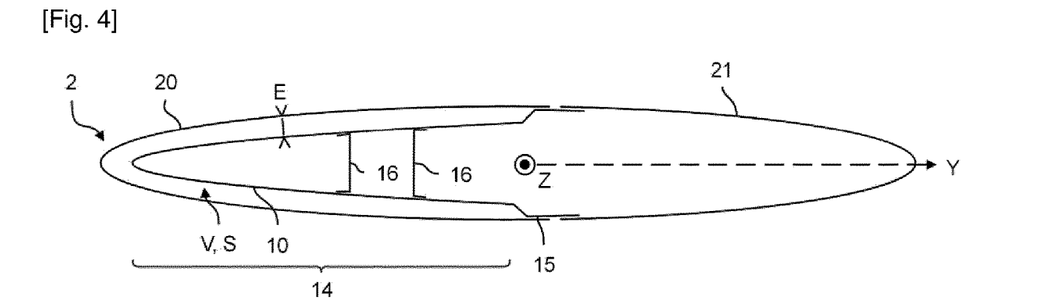
FIG. 4 is a representation in a transverse cross-section view of the support arm of FIG. 3.

With reference to FIG. 3, the inner wall 10 of the de-icing device 1 extends into the cavity 22 of the support arm 2 from the external opening 23 at the duct 4 to the internal opening 24 at the speed attenuator 3 along the axis Z. The inner wall 10 thus allows guiding the de-icing air flow $F_D$ along the axis Z over the entire length of the upstream outer wall 20. As illustrated in FIGS. 3 and 4, the inner wall 10 upstream comprises a guide portion 14 for guiding the de-icing air flow $F_D$ and downstream an attachment portion 15 for attaching to the support arm 2, more precisely at the joint between the upstream outer wall 20 and the downstream outer wall 21. The de-icing volume V thus delimited allows the de-icing air flow $F_D$ to be circulated against the upstream outer wall 20, for overall de-icing. Preferably, the attachment portion 15 is welded or assembled by attachment elements, such as screws, to the support arm 2, so as to fixedly hold the inner wall 10. Preferably, the inner wall 10 comprises titanium for high mechanical strength and thermal resistance.

In the example of FIGS. 3 and 4, the guide portion 14 has a shape substantially identical to that of the upstream outer wall 20, namely a transverse U-shaped downstream open cross-section. In other words, the de-icing volume V has a transverse U-shaped downstream open cross-sectional area S. The de-icing air flow $F_D$ is thus advantageously concentrated against the upstream outer wall 20 in a de-icing volume V with restricted dimensions. It is set out that the term "transverse" is employed here with reference to the axis Z of the support arm 2, and is thus defined as "oriented along an axis Y normal to the axis Z" (FIGS. 3 and 4).

Preferably, the de-icing volume V has a transverse cross-sectional area S with a value substantially constant along the axis Z so as to maintain the speed of the de-icing air flow $F_D$. This promotes heat exchanges by conduction and convection with the upstream outer wall 20. The de-icing volume V further comprises a thickness E, defined as the radial distance separating the upstream outer wall 20 from the inner wall 10 with respect to the axis Z, which is substantially constant throughout the radial perimeter of the transverse surface area S. The thickness E is preferably less than 30 mm and greater than 2 mm.

In the example of FIGS. 3 and 4, the de-icing device 1 further comprises holding elements 16 mounted in the cavity 22 of the support arm 2 along the axis Z so as to connect the branches of the inner wall 10 of the U transverse cross-section. Such holding elements 16 make it possible to hold the inner wall 10 in position in addition to the attachment portion 15 and keep the thickness E of the de-icing volume V.

Figure 5:
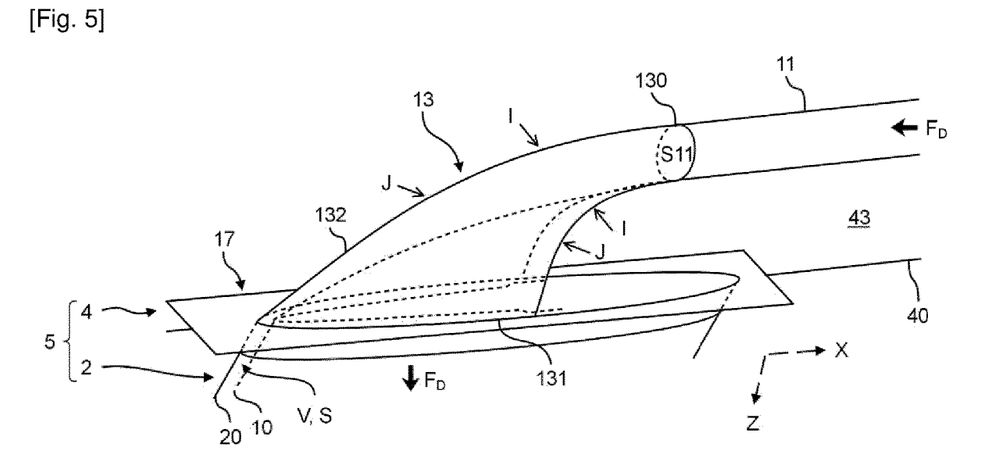
FIG. 5 is a perspective representation of a fluidic connection member of the air inlet of FIG. 2.
Figure 7:
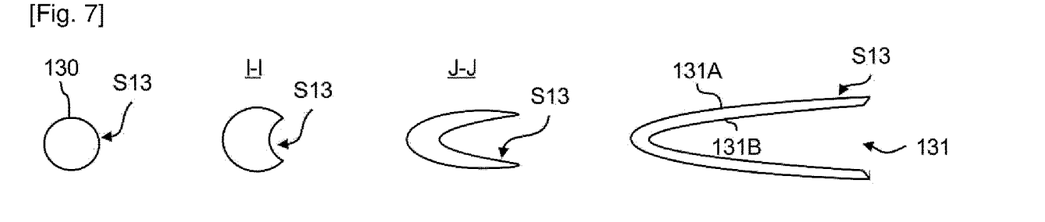
FIG. 7 is a representation of four transverse cross-section views of the fluidic connection member of FIG. 5.

With reference to FIG. 5, the fluidic connector member 13 is mounted in the annular cavity 43 of the duct 4 and is in the form of a hollow curved conduit 132 comprising an inlet opening 130 leading into the supply conduit 11 and an outlet opening 131 leading to the external opening 23 in the de-icing volume V. The fluidic connector member 13 further comprises a scalable cross-sectional area, namely its transverse cross-sectional area gradually changes along the fluidic connection member 13 so as to adapt to the conventionally circular cross-section of the supply conduit 11 and the U-shaped cross-section of the de-icing volume V. FIG. 7 illustrates the scalable cross-sectional area of the fluidic connector member 13:

at the inlet opening 130, which has a circular shape, at a transverse plane I-I (FIG. 5) closer to the inlet opening 130 than to the outlet opening 131, which has a truncated circular shape, at a transverse plane J-J (FIG. 5) closer to the outlet opening 131 than the inlet opening 130, which is crescent-shaped, and at the outlet opening 131, which has an U-shape, configured to cooperate with the external opening 23.

Such a scalable cross-sectional area makes it possible to limit head losses of the de-icing air flow $F_D$ and thus to ensure a sufficient speed once in the de-icing volume V to provide good heat exchanges. In the example in FIG. 7, the transverse surface area S13 is substantially constant along the fluidic connection member 13. In other words, the four transverse cross-sections shown in FIG. 7 delimit a cross-sectional surface area S13 of equal value. The value of the cross-sectional surface area S13 is moreover preferably equal to that of the cross-sectional area S of the de-icing volume V and that of the cross-sectional area SI 1 of the supply conduit 11 to maintain the speed of the de-icing air flow $F_D$.

Figure 6:
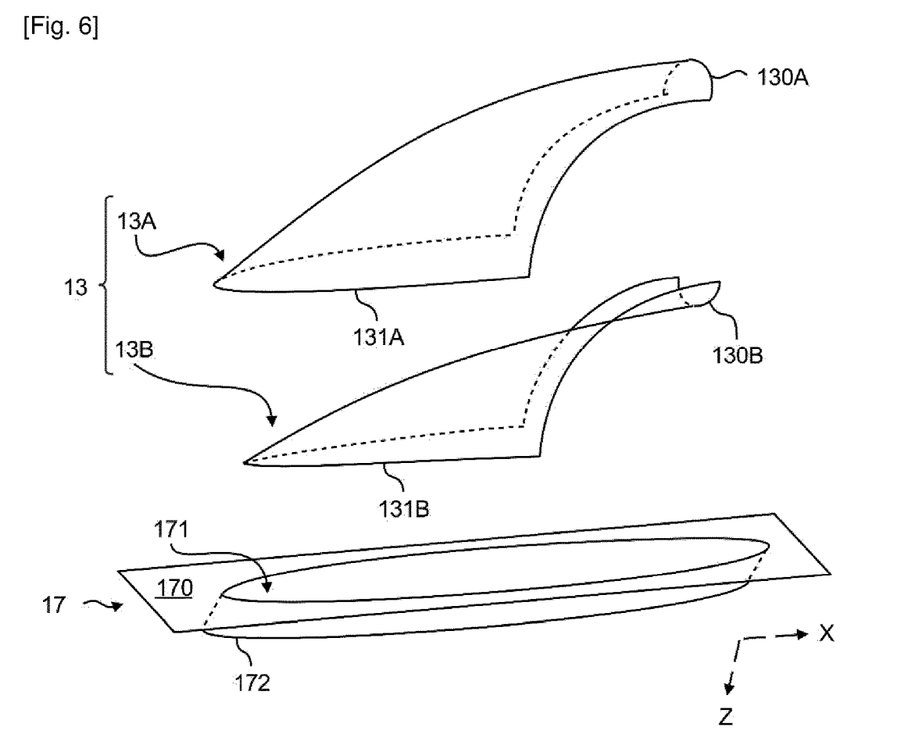
FIG. 6 is a representation in an exploded view of the fluidic connection member of FIG. 5.

As illustrated in FIG. 6, the scalable cross-sectional area of the fluidic connection member 13 is obtained by virtue of a hollow conduit 132 made from an external portion 13A and an internal portion 13B, which are assembled or welded together. The external portion 13A comprises a half-circle-shaped inlet end 130A to cooperate with the supply conduit 11 and a U-shaped outlet end 131A to cooperate with the upstream outer wall 20 of the support arm 2. The internal portion 13B in turn comprises a half-circle-shaped inlet end 130B to cooperate with the supply conduit 11 in a complementary manner to the external portion 13A as well as a U-shaped outlet end 131B to cooperate with the inner wall 10. Alternatively, the external portion 13A and the internal portion 13B are made as one piece, for example by 3D printing.

As illustrated in FIGS. 5 and 6, to promote holding of the fluidic connection member 13, the de-icing device 1 moreover comprises a connecting member 17 comprising a plate 170 mounted in the annular cavity 43 of the duct 4 bearing on the internal wall 40. The plate 170 comprises an opening 171 extending protruding along the axis Z in order to cooperate with the upstream outer wall 20 and the downstream outer wall 21 of the support arm 2. More precisely, the opening 171 has an oval cross-section substantially identical to that of the cylindrical cavity 22 of the support arm 2 at the external opening 23, to enable them to be assembled, preferably by interlocking along the axis Z. The fluidic connection member 13 extends inside the opening 171 in order to cooperate with the external opening 23 of the de-icing volume V.

Figure 8A:
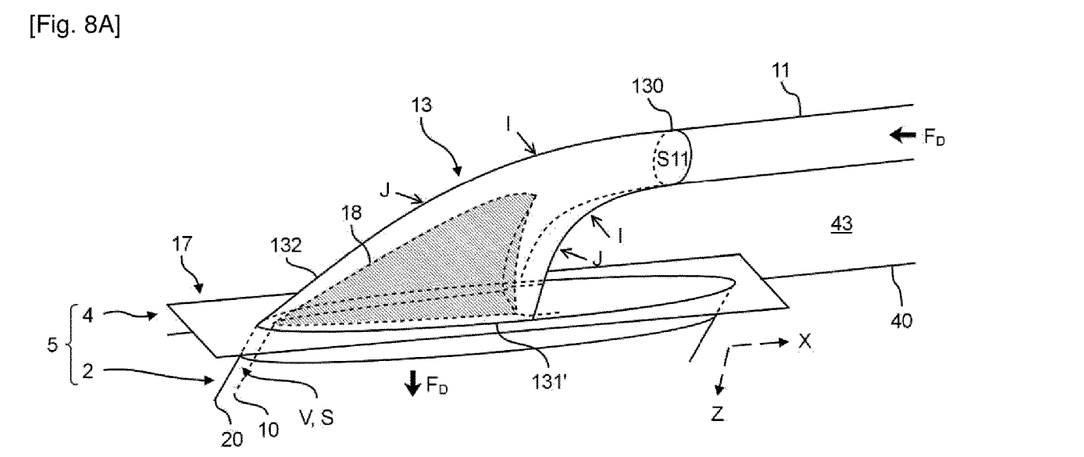
FIG. 8A is a perspective representation of a fluidic connection member according to one alternative embodiment of the invention.
Figure 8B:
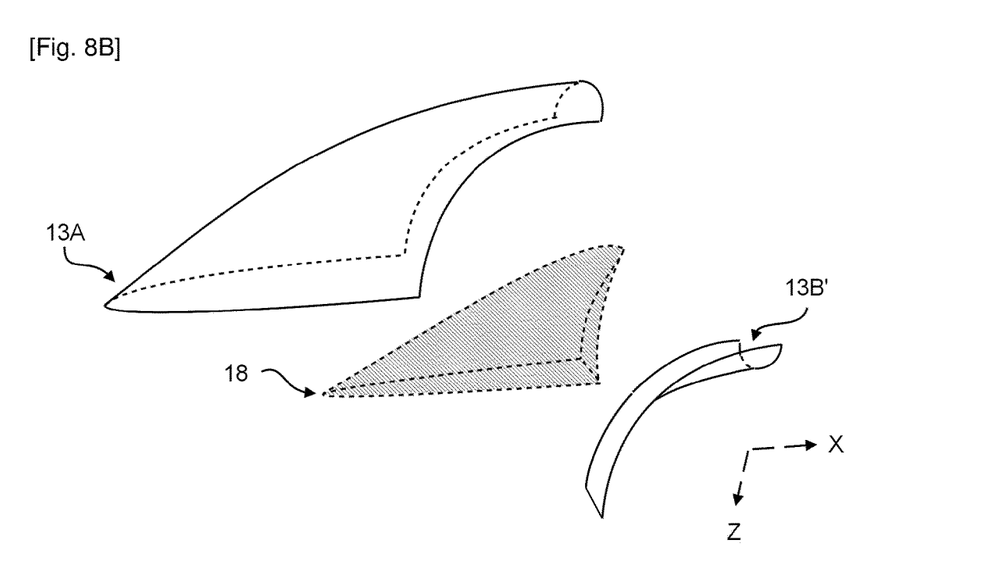
FIG. 8B is a representation in an exploded view of the fluidic connection member of FIG. 8A.
Figure 8C:
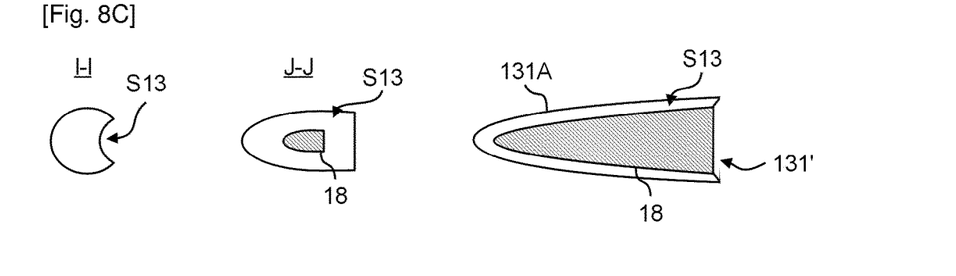
FIG. 8C is a representation of three transverse cross-section views of the fluidic connection member of FIG. 8A.

As illustrated in FIGS. 8A, 8B and 8C, according to an alternative embodiment of the invention, the fluidic connection member 13' comprises a volume element 18 housed inside a hollow conduit 132 so as to delimit together the scalable cross-sectional area of the fluidic connection member 13'. In this embodiment, the hollow conduit 132 has a substantially annular scalable cross-sectional area and the volume element 18 partially fills the inner cavity of the hollow conduit 132 in order to form transverse cross-sections illustrated in FIG. 8C and similar to those of FIG. 7.

As illustrated in FIG. 8A, the volume element 18 is mounted in such a way as to extend as an external extension of the inner wall 10, in order to guide the de-icing air flow $F_D$ in the de-icing volume V. The volume element 18 further comprises a cross-section decreasing outwardly with respect to the longitudinal axis X with an aerodynamically rounded edge, to reduce head losses in the fluidic connection member 13'. Preferably, the volume element 18 delimits a transverse cross-sectional area S13 with a substantially constant value with the external portion 13A and the internal portion 13B'. Thus, as illustrated in FIG. 8C, the value of the transverse surface area S13 in plane I-I in the form of a truncated disk is equal to that in plane J-J in the form of an upside-down D and to that of outlet opening 131' as a downstream open U shape at the external opening 23. This alternative embodiment advantageously allows the use of a fluidic connection member 13' in simplified form, namely whose internal portion 13B' does not cooperate with the U-shaped inner wall 10 but only delimits downstream the outlet opening 131'.

Figure 9A:
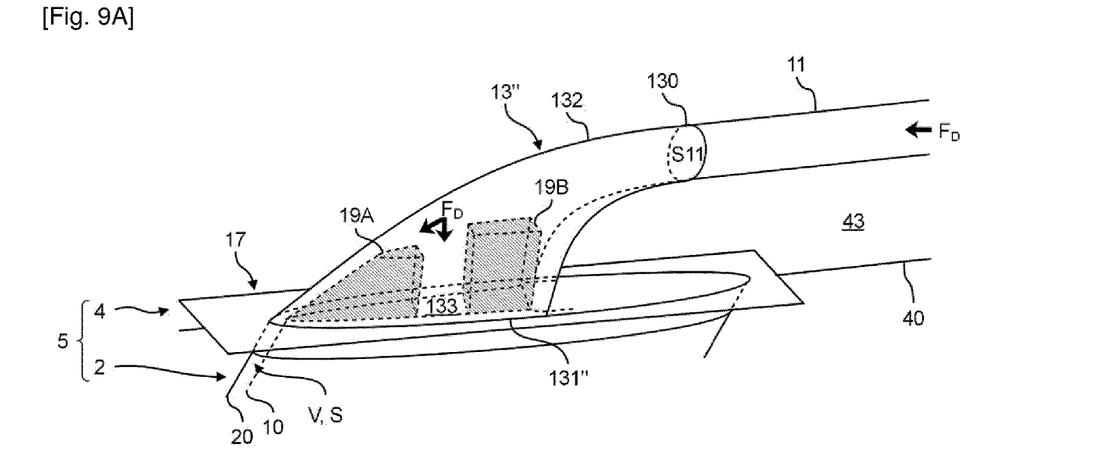
FIG. 9A is a perspective representation of a fluidic connection member according to one alternative embodiment of the invention.
Figure 9B:
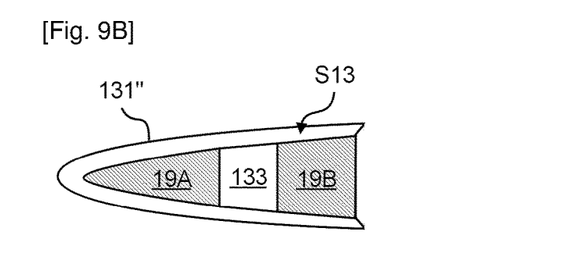
FIG. 9B is a representation of three transverse cross-section views of the fluidic connection member of FIG. 9A.

FIGS. 9A and 9B illustrate another alternative of the invention in which the fluidic connection member 13" comprises, in addition to the outlet opening 131" leading to the de-icing volume V, an auxiliary outlet opening 133 to supply the cavity 34 of the speed attenuator 3 with de-icing air flow $F_D$. In other words, the fluidic connection member 13" makes it possible to drive the de-icing air flow $F_D$ for the support arm 2 but also for the speed attenuator 3.

More precisely, the auxiliary outlet opening 133 extends between the branches of the U-shaped outlet opening 131. The fluidic connection member 13" further comprises two volume elements 19A, 19B delimiting upstream and downstream the auxiliary outlet opening 133. As for the alternative of FIGS. 8A to 8C, the volume elements 19A, 19B comprise an aerodynamic shape to guide the de-icing air flow $F_D$ and such that the transverse surface area S13 is substantially along the fluidic connection member, equal to the sum of the surface areas of the outlet opening 131 and of the auxiliary outlet opening 133. It is set out that in this embodiment, the supply conduit 11 and the fluidic connection member 13 are common for de-icing the support arm 2 and the speed attenuator 3. The fluidic connection member 13 ensures separation of the de-icing air flow $F_D$ delivered in the de-icing volume V and that intended for the cavity 34 of the speed attenuator 3, in practice delivered by a conduit (not represented) leading to the auxiliary outlet opening 133 and to the inner partition wall 33.

A fluidic connection member 13, 13', 13" according to several embodiments of the invention for connecting the supply conduit 11 and the de-icing volume V, or even the cavity 34 of the speed attenuator 3 has been set forth. It goes without saying that a fluidic connection member 13, 13', 13" could also be provided to connect the de-icing volume V and the discharge conduit 12, or even the cavity 34 of the speed attenuator 3. The previous description remains valid by replacing the terms inlet opening 130, outlet opening 131, auxiliary outlet opening 133 and supply conduit 11 with the terms outlet opening 130, inlet opening 131, auxiliary inlet opening 133 and outlet conduit 12 respectively.

Figure 10:
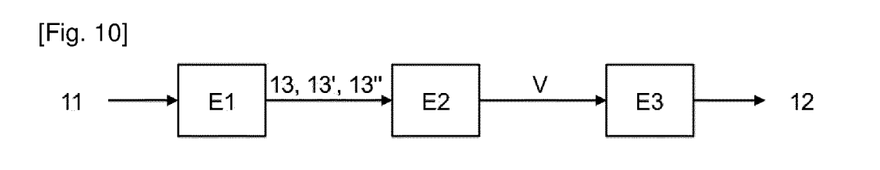
FIG. 10 is a schematic representation of the steps of the method for de-icing a support arm according to one embodiment of the invention.

The invention also relates to a method for de-icing the support arms 2 of a supersonic air inlet 5 by means of the de-icing device 1 previously set forth. With reference to FIG. 10, the de-icing method comprises first of all a step of supplying E1 the de-icing volume V with de-icing air flow $F_D$, followed by a step of circulating E2 in the de-icing volume V and finally a step of discharging E3 the de-icing air flow $F_D$ out of the de-icing volume V.

As illustrated in FIGS. 2 and 10, more precisely, during the supply step E1, the de-icing air flow $F_D$ is conveyed through the supply conduit 11 from its collection point, in the air flow F at the compressor of the turbomachine 7 or other, up to the de-icing volume V. For this, the de-icing air flow $F_D$ passes through the duct 4 and the fluidic connection member 13, 13', 13". The speed of the de-icing air flow $F_D$ is kept substantially constant by virtue of the aerodynamic shape and the scalable cross-sectional area of the fluidic connection member 13, 13', 13".

As illustrated in FIGS. 3 and 10, during the circulation step E2, the de-icing air flow $F_D$ circulates along the axis Z of the support arm 2 in the de-icing volume V in contact with the upstream outer wall 20 in order to warm it up by convective but also conductive heat exchanges, in order to de-ice it. The speed of the de-icing air flow $F_D$ is kept substantially constant to promote heat exchanges throughout the de-icing volume V.

With reference to FIGS. 2 and 10, during the discharge step E3, the de-icing air flow $F_D$, whose temperature has decreased to warm up the upstream outer wall 20, joins the discharge conduit 12 to be rejected into the air flow F downstream of the speed attenuator 3.

In the case of a fluidic connection member 13" as illustrated in FIGS. 9A and 9B, the method also allows de-icing the cavity 34 of the speed attenuator 3 by commonly supplying the de-icing volume V and said cavity 34.

To sum up, the invention makes it possible to de-ice and prevent the occurrence of ice on the upstream outer wall 20 of the support arms 2 of a supersonic air inlet 5 of an aircraft propelling assembly 8. De-icing is advantageously effective and of low overall space because it is targeted in contact with the upstream outer wall 20 and not in the entire cylindrical cavity 22 of the support arms 2. For this, an inner wall 10 is added to the cavity 22 in order to delimit a restricted de-icing volume V, where the speed of the de-icing air flow $F_D$ is kept substantially constant for efficient heat exchanges. A fluidic connection member 13 with a scalable and constant cross-sectional area ensures optimal supply with de-icing air flow $F_D$.

Figure 11A:
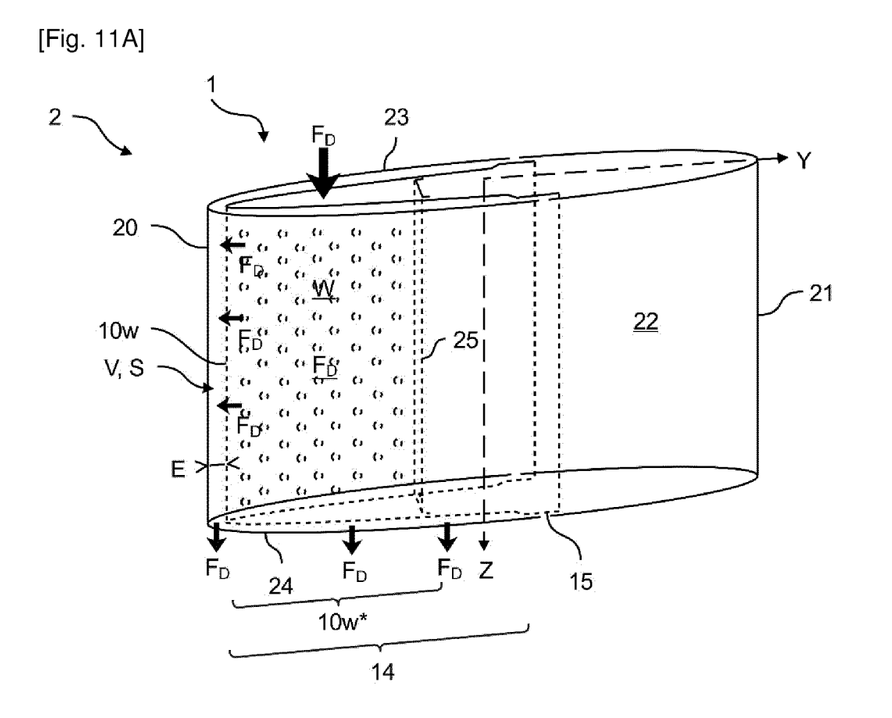
FIG. 11A is a perspective representation of an air inlet support arm according to one alternative embodiment of the invention.
Figure 11B:
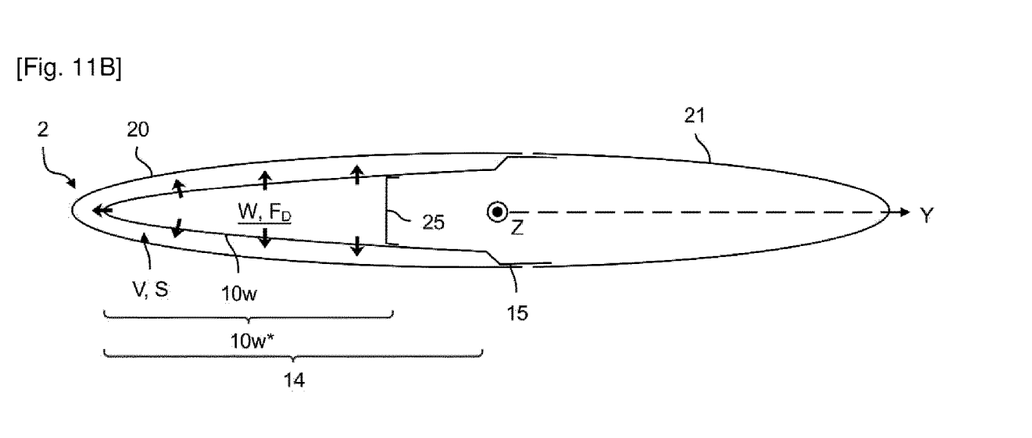
FIG. 11B is a representation in a transverse cross-section view of the support arm of FIG. 11A.

According to another aspect of the invention, as illustrated in FIGS. 11A and 11B, the de-icing device 1 differs from that described previously in that it comprises an inner partition wall mounted internally to the inner wall $10w$ integrally in order to delimit together a feed volume W. In addition, the inner wall $10w$ comprises upstream of the inner partition wall 25 a perforated portion $10w^*$ in order to fluidly communicate the feed volume W with the de-icing volume V. Stated differently, the de-icing air flow $F_D$ is configured to be taken into the feed volume W and then to pass through the perforated portion $10w^*$ of the inner wall $10w$ in order to circulate in the de-icing volume V. The perforated portion $10w^*$ thus allows the de-icing air flow $F_D$ to be guided as close as possible to the external wall 20 and to accelerate it to while passing through the perforations, to promote de-icing.

In the example of FIGS. 11A and 11B, the feed volume W extends from the internal wall of the duct 4 to the supersonic speed attenuator 3 along the axis Z inwardly oriented, namely in parallel to the inner cavity 22 of the support arm 2. The feed volume W moreover has a cross-section transverse to the axis Z, which is semi-ellipsoidal with an upstream oriented curved tapered edge.

Figure 11C:
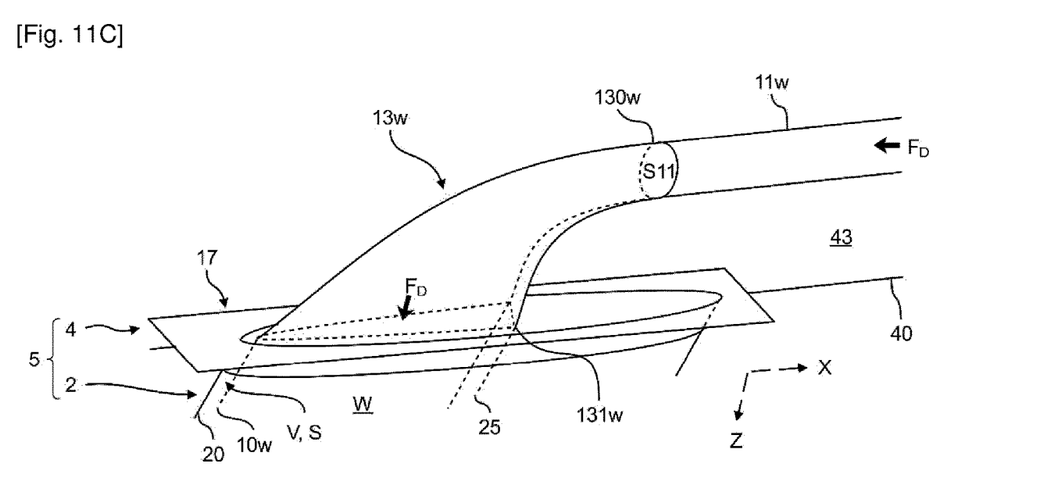
FIG. 11C is a perspective representation of a member for fluidly connecting to the support arm of FIG. 11A.

With reference to FIG. 11C, the feed volume W is open at the internal wall 40 of the duct 4 and supplied with de-icing air flow $F_D$ by the fluidic connection member $13w$. In other words, contrary to the previous embodiments, the fluidic connection member $13w$ is configured to connect the supply member $11w$ and the feed volume W. Thus, the outlet opening $131w$ lead to the feed volume W at the external opening and preferably comprises a cross-section identical to the feed volume W to ensure the cooperation thereof. It is set out that, as for the previous embodiments, the fluidic connection member $13w$ has a scalable cross-sectional area and a transverse surface area with a value substantially constant over its entire length, equal to the value of the cross-sectional surface area of the feed volume W and that of the transverse surface area S11 of the supply member $11w$.

In the example of FIG. 11A, the de-icing air flow $F_D$ is then discharged from the de-icing volume V to the discharge device 12 (FIG. 2) as well as in the previous embodiments. Preferably, the feed volume W is closed at the supersonic speed attenuator 3, so that the entire de-icing air flow $F_D$ in the feed volume W circulates in the de-icing volume V by passing through the perforated portion $10w^*$ of the inner wall 10.

Additionally, the de-icing method previously described differs for the alternative illustrated in FIGS. 11A, 11B and 11C in that the step of supplying E1 with de-icing air flow $F_D$ is implemented in the feed volume W. This de-icing volume V is indirectly supplied by the supply member $11w$, via the feed volume W. During the circulation step E2, the de-icing air flow $F_D$ thus flows from the feed volume W to the de-icing volume V by passing through the perforated portion $10w^*$ of the inner wall 10. The circulation E2 of the de-icing air flow $F_D$ in the de-icing volume V and the discharge step E3 are additionally identical to the previously stated de-icing method and are therefore not further described.

The invention claimed is:

1. A supersonic air inlet of an aircraft propeller assembly, said aircraft propeller assembly extending longitudinally along an axis oriented from upstream to downstream and comprising a turbomachine configured to allow propulsion of an aircraft at supersonic speeds from acceleration of a subsonic air flow circulating from upstream to downstream in the turbomachine, said supersonic air inlet comprising:
   a duct with a longitudinal axis comprising an internal wall configured to guide the air flow into the turbomachine and an external wall connected upstream through an air inlet lip and delimiting together an annular cavity,
   a speed attenuator fixedly mounted inside the duct along the longitudinal axis and comprising a conical outer wall with an upstream tapered edge so as to generate a shock wave reducing the supersonic speed of the air flow entering the duct into the subsonic speed, and
   at least one support arm connecting the speed attenuator to the duct, said support arm comprising an upstream outer wall and a downstream outer wall together delimiting a cavity extending from the internal wall of the duct to the speed attenuator along an axis inwardly oriented,
   which supersonic air inlet comprises at least one de-icing device comprising:
      an inner wall mounted in the cavity of the support arm facing the upstream outer wall so as to delimit together a calibrated de-icing volume,
      at least one member for supplying the de-icing volume with de-icing air flow, and
      at least one member for discharging the de-icing air flow from the de-icing volume.

2. The supersonic air inlet according to claim 1, wherein the inner wall of the de-icing device comprises a guide portion for guiding the de-icing air flow having a substantially identical shape to that of the upstream outer wall of the support arm.

3. The supersonic air inlet according to claim 1, wherein the de-icing volume has a cross-sectional area of substantially constant value along the axis of the support arm.

4. The supersonic air inlet according to claim 1, wherein the de-icing volume extends along the axis of the support arm between an external opening formed in the internal wall of the duct and an internal opening formed in the outer wall of the speed attenuator.

5. The supersonic air inlet according to claim 4, wherein the de-icing device comprises a fluidic connection member comprising an inlet opening leading to the at least one member for supplying and an outlet opening leading to an opening of the de-icing volume, the fluidic connection member comprising a cross-sectional area that having a form that gradually transitions from the cross-section of the supply member to the cross-section of the de-icing volume to define a variable cross-sectional area.

6. The supersonic air inlet according to claim 5, wherein the fluidic connection member has a transverse surface area of a substantially constant value throughout its length.

7. The supersonic air inlet according to claim 5, wherein the fluidic connection member comprises a hollow conduit delimiting the variable cross-sectional area of the fluidic connection member.

8. The supersonic air inlet according to claim 5, wherein the fluidic connection member comprises a hollow conduit and at least one volume element housed in the hollow conduit in such a way as to delimit together the variable cross-sectional area of the fluidic connection member.

9. The supersonic air inlet according to claim 5, wherein the speed attenuator comprises an inner partition wall delimiting, with the conical outer wall, a cavity, the fluidic connection member comprising an auxiliary outlet opening configured to supply the cavity of the speed attenuator with de-icing air flow.

10. A method for de-icing at least one support arm of an air inlet of an aircraft propelling assembly according to claim 1, said method comprising:
   a step of supplying the de-icing volume with de-icing air flow via the supply member,
   a step of circulating the de-icing air flow in the de-icing volume, in order to warm up the upstream outer wall of the support arm by heat exchanges, in order to de-ice it, and
   a step of discharging the de-icing air flow in the discharge member out of the de-icing volume.

11. A supersonic air inlet of an aircraft propeller assembly, said aircraft propeller assembly extending longitudinally along an axis oriented from upstream to downstream and comprising a turbomachine configured to allow propulsion of an aircraft at supersonic speeds from acceleration of a subsonic air flow circulating from upstream to downstream in the turbomachine, said supersonic air inlet comprising:
   a duct with a longitudinal axis comprising an internal wall configured to guide air flow into the turbomachine and an air inlet lip connected to the internal wall and an external wall, which together delimit an annular cavity,
   a speed attenuator fixedly mounted inside the duct along the longitudinal axis and comprising a conical outer wall with an upstream tapered edge so as to generate a shock wave reducing the supersonic speed of the air flow entering the duct into the subsonic speed,
   a support arm comprising an upstream outer wall and a downstream outer wall together delimiting a cavity, said support arm connected to the speed attenuator and the duct so that said cavity is bounded by the internal wall of the duct and the speed attenuator,
   a de-icing device comprising a de-icer having an inner wall mounted in the cavity of the support arm and facing the upstream outer wall so as to define a de-icing volume with the upstream outer wall,
   a supply line having a bore for supplying the de-icing volume with de-icing air flow, and
   a discharge line having a bore for discharging the de-icing air flow from the de-icing volume.

12. The supersonic air inlet according to claim 11, wherein the de-icing device comprises a fluidic connection member comprising an inlet opening leading to the supply line and an outlet opening leading to an opening of the de-icing volume.

13. The supersonic air inlet according to claim 11, wherein the fluidic connection member comprises a cross-sectional area having a form that gradually transitions from a cross-section of the supply line to a cross-section of the de-icing volume.

14. The supersonic air inlet according to claim 12, wherein the fluidic connection member has a transverse surface area of a substantially constant value throughout its length.

15. The supersonic air inlet according to claim 12, wherein the fluidic connection member has a hollow conduit that delimits the cross-sectional area of the fluidic connection member.

16. The supersonic air inlet according to claim 12, wherein the fluidic connection member comprises a hollow conduit and at least one volume element housed in the hollow conduit in such a way as to delimit the cross-sectional area of the fluidic connection member.

17. The supersonic air inlet according to claim 12, wherein the speed attenuator comprises an inner partition wall delimiting, with the conical outer wall, a cavity.

18. The supersonic air inlet according to claim 17, wherein the fluidic connection member comprises an auxiliary outlet opening configured to supply the cavity of the speed attenuator with de-icing air flow.

* * * * *